Feb. 23, 1943. J. A. VAN DEN AKKER 2,312,010
PHOTOMETER
Filed Aug. 3, 1940 5 Sheets-Sheet 1

Inventor:
Johannes A. Van den Akker,
By Soans, Pond, & Anderson
Attorneys.

Patented Feb. 23, 1943

2,312,010

UNITED STATES PATENT OFFICE 2,312,010

PHOTOMETER

Johannes A. Van den Akker, Appleton, Wis., assignor to The Institute of Paper Chemistry, Appleton, Wis., a corporation of Wisconsin Application August 3, 1940, Serial No. 350,184

23 Claims. (Cl. 88—14)

My invention relates, generally, to photometers, and it has particular relation to photometers which may be used in connection with spectrographs to obtain spectral intensity data of various types.

There is a considerable need in photographic spectrophotometry for an improved spectrophotometer which will yield, in one exposure, complete data for spectral intensity determinations including spectral transmittance or absorption spectra measurements, spectral reflectance or diffuse reflectance measurements, quantitative spectroscopic or emission spectra analysis, and relative spectral energy distribution or spectro-radiometery measurements. For example, in analytical work, ultra-violet absorption spectra of various organic and inorganic compounds afford a ready means of identification and measurement of concentrations. And, such instruments may be used to advantage in the investigation of the spectral reflectance of different types and grades of paper in the ultraviolet or other regions. Many other important applications for an improved spectrophotometer of this general type will be apparent, and certain particular instances will be referred to in some detail hereinafter.

At the present time, however, existing methods for obtaining complete spectral intensity data as outlined above are either too slow, too laborious, or too inaccurate, or involve equipment, too costly for most laboratories, and of dubious practicability. In what has been considered to be the best existing apparatus for obtaining, in a single exposure, a photographic plate from which complete spectral intensity data may be obtained, a very complex and costly quartz prism optical arrangement is required.

In a rather more popular method, using apparatus of somewhat more moderate cost, a spectrogram of light transmitted through an unknown sample is obtained, and immediately adjacent thereto, a second spectrogram is formed of light after passage through a rapidly rotating sector of known angular opening. Then other pairs of adjacent sample and standard spectrograms are obtained with the sector opening set at different known angles. This latter method is open to certain major objections, the most important being that only one pair of adjacent spectra is obtained at a time, and therefore several different sets of exposures are required in order to obtain complete spectral intensity data. Furthermore, the intensity of the light source used must be held to a substantially constant value between successive sets of exposures, which is a condition difficult to meet in actual practice, and the two light beams must be kept matched, which necessitates frequent checking.

Accordingly, an important object of my invention is to provide for obtaining complete data for spectral intensity measurements in a single exposure period using a single source of light and a single light beam. As will hereinafter appear, this object is accomplished by providing a sector photometer wherein the sample under test is subjected to a single light beam in phase with a sector opening of uniform angular width, while a spectral standard cuts the same light beam in phase with a sector opening of graduated angular width.

Another important object of my invention is to provide apparatus for obtaining complete spectral intensity data in a single exposure period which is much simpler structurally and which costs substantially less than present apparatus intended for this work, while at the same time having greatly improved operating performance over this more costly equipment.

Another important object of my invention is to provide apparatus for obtaining complete spectral intensity data by exposing alternately a sample and a spectral standard to the same light beam at a relatively high frequency, this arrangement completely eliminating the erroneous results sometimes occurring in spectrophotometric measurements with the previously known apparatus due to changes in the intensity of the light source between measurements.

A further important object of my invention is to provide a spectrophotometer of the multi-step sector type having a spectral range of usefulness substantially as great as that of any spectrograph which might be used therewith, and which may be used in the ultra-violet, visible, and infra-red regions of the spectrum without requiring adjustments to correct for dispersion.

A still further important object of my invention is to provide for clarifying a turbid sample solution by centrifugal action while spectral transmittance data is being taken thereon in a spectrophotometer.

Other important objects of my invention include the provision of a spectrophotometer of the sector type which is operable to provide for obtaining a series of alternate spectral sample and spectral standard spectrograms on the photographic plate in a spectrograph by having a single light beam pass alternately through the sample under test in optical alignment with a sector opening of uniform angular width and one grating section, and then through the spectral standard in optical alignment with a sector opening of graduated angular width and another grating section; the provision of a multistep sector photometer which may be readily arranged or converted for use in taking spectral transmittance data, or spectral reflectance data, or relative spectral energy distribution data, or for use in connection with quantitative spectroscopic analysis; and, generally the provision of an improved spectrophotometer of the sector type which is of relatively rugged construction and which requires very simple optical equipment.

Other objects and the various novel features and advantages of my invention will, in part, be obvious, and, in part, will appear in the accompanying drawings. In the drawings—

Figure 1:
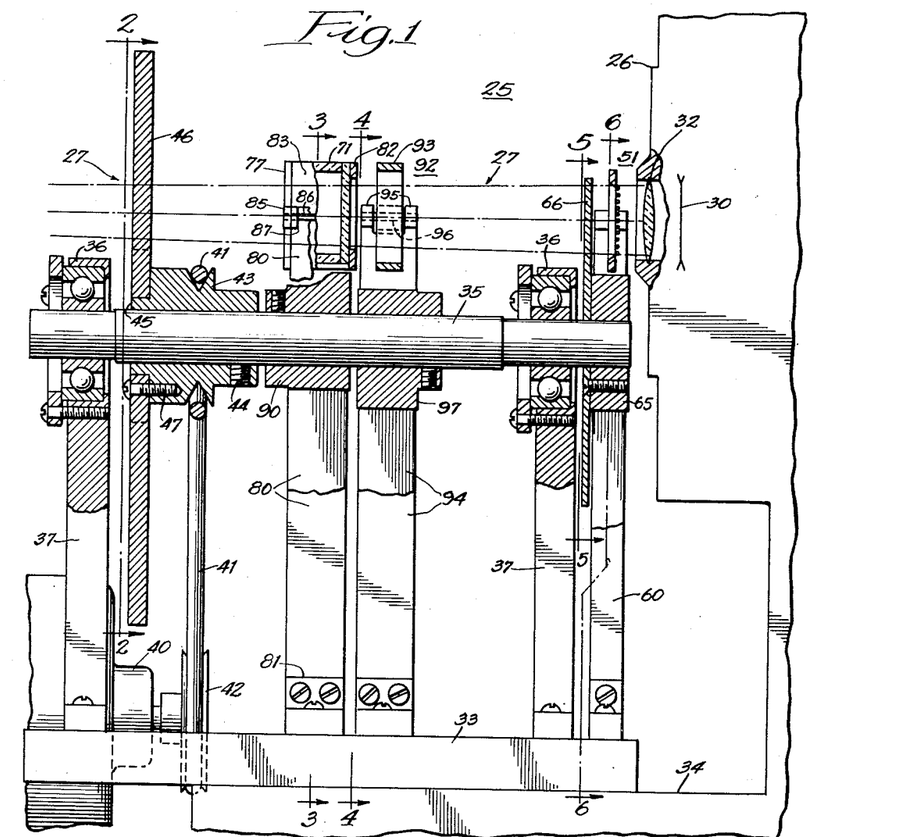
Figure 1 is a fragmentary, side elevational view, partly in vertical section, of a multi-step sector photometer illustrating one embodiment of my invention, mounted on a spectrograph, for use in obtaining spectral transmittance data.

Referring particularly to Fig. 1, a multi-step sector photometer, which embodies the features of my invention and which is particularly designed for use in obtaining spectral transmittance data (absorption spectra), is indicated generally at 25. The photometer 25 is mounted on the front of, and in optical alignment with, a spectrograph 26 which may be of any suitable standard type.

A light beam is indicated diagrammatically at 27 as passing along the optic axis of the sector photometer 25 and into the slit of the spectrograph 26, indicated diagrammatically at 30. The light beam 27 may be emitted from any light source (not shown) suitable for this type of investigation, such as an iron arc. After passing through the sector photometer 25, the light beam 27 passes through a lens 32 in the spectrograph 26 mounted in front of the slit 30. The lens 32 serves to cause all light passing through the slit 30 to be condensed upon the dispersing prism of the spectrograph. The optic axis of the photometer is in alignment with the optic axis (and hence with the collimating system) of the spectrograph 26.

The structural parts of the sector photometer 25 include a base 33 which may be releasably secured on the base 34 of the spectrograph 26 by suitable bolts (not shown). The base 33 serves as the main support for the different elements and parts of the sector photometer 25.

In order to provide for rotatably mounting and driving the rotatable elements of the sector photometer 25, a shaft 35 is mounted in a pair of bearings 36 in substantially parallel alignment with, and below, the optic axis thereof. The bearings 36 are preferably of the ball bearing type, and are suitably carried in two pairs of upright bearing supports 37 mounted on the base 33.

Figure 2:
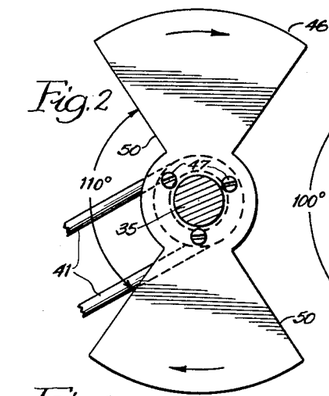
Figure 2 is an elevational view of a sector flywheel forming a part of the apparatus illustrated in Figure 1. The view is taken on line 2—2 of Figure 1.

An electric motor 40, mounted on the left hand end of the base 33 and to one side thereof, serves as the driving means for the rotatable elements of the photometer 25. The motor 40 is connected in driving relationship with the shaft 35 by means of an endless belt 41 running over the driving pulley 42 of the motor 40 and a pulley 43 adjustably secured on the shaft 35 by a set screw 44. The left end of the pulley 43 is machined so as to form a collar 45, on which a sector fly wheel 46 may be centrally carried. The sector fly wheel 46 may be held in place on the left side of the pulley 43, which serves as a hub therefor, by three screws as illustrated at 47 (Fig. 2).

The sector fly wheel 46 serves as a balance wheel for the sector photometer 25 thereby maintaining substantially uniform driving speed during each revolution thereof, and by virtue of the two symmetrically disposed sector openings 50 (Fig. 2) the fly wheel 46 also accomplishes a shutter function permitting passage of the light beam 27 through the sector photometer 25 during two equal periods on each revolution of the drive shaft 35. The two sector openings 50 are approximately 110° in angular width and are displaced 180° from each other.

During the operation of the apparatus the light beam 27 is divided into two sets of separate bands, this division occurring as an incident to each single rotation of the shaft 35. The means for accomplishing this division of the light beam 27 includes a two-sectioned, grating screen, indicated generally at 51, which is so supported that it will be shiftably moved across the optic axis of the apparatus during each rotation of the shaft 35, as particularly shown in Fig. 6. Thus during the first period of each rotation of the shaft 35, the grating screen 51 first divides the light beam 27 so as to form on the slit 30 a series of alternately illuminated and darkened bands, while during the remaining period, it divides the light beam 27 so as to form on the slit 30 a second series of alternately illuminated and darkened bands. In the second series, the illuminated bands are in the same location relative to the slit 30 as are the darkened bands in the first series, while conversely, the dark bands of the second series are in the same location relative to the slit 30 as the illuminated bands in the first series.

Figures 5, 7, 8:
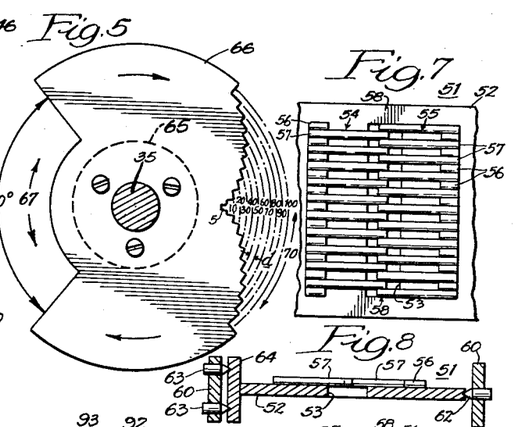
Figure 5 is an elevational view of a sector disc taken on line 5—5 of Figure 1.
Figure 7 is an enlarged, fragmentary, elevational view, taken from the rear, of the grating screen shown in Figure 6.
Figure 8 is an enlarged, horizontal sectional view taken on line 8—8 of Figure 6.
Figure 6:
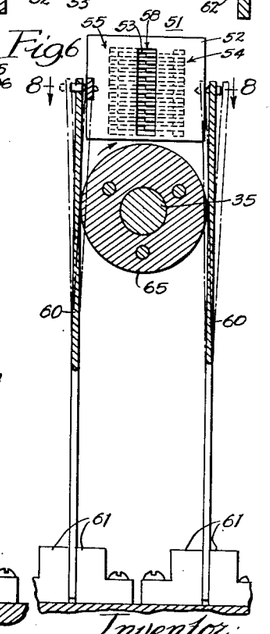
Figure 6 is a fragmentary, elevational view partly in vertical section taken on line 6—6 of Figure 1.

Referring now to Figs. 6, 7, and 8, it will be seen that the two-sectioned, grating screen 51 includes a plate 52 having a vertical slot 53 formed therein. Two grating sections 54 and 55 (Fig. 7) are formed by a number of relatively long rods 57 staggered on opposite sides of the slot 53, as shown, and maintained in spaced apart relationship by short rods 56 of the same diameter.

The rods 56 and 57 are of substantially the same diameter and are carefully machined within fairly close tolerances. The long rods 57 interfit at the center of the vertical slot 53, as shown (Fig. 7) to form a central zone of overlap designated as 58. The long rods 57 must be especially smooth, free from scratches, and of uniform diameter, on the end portions lying over the slot 53. The inner ends of the long rods 57 are also squared off. The rods 56 and 57 are carefully arranged and clamped in place on the plate 52 and then soldered together thereto. This arrangement forms a very satisfactory grating screen. However, it will be understood that other equivalent grating constructions may be used. For example, a satisfactory grating screen could be cut from a thin metal sheet.

In order to shift the grating screen 51 back and forth across the optic axis of the sector photometer 25 in phase with the rotation of the shaft 35, the grating screen 51 is mounted between the upper ends of a pair of upright, thin, spring steel, reeds 60 (Fig. 6). Each of the reeds 60 is rigidly secured at its lower end to the base 33 between a pair of machined blocks 61, as shown.

The grating screen 51 is mechanically connected to the reeds 60 by a three-point support means which includes three pointed, metallic, support pins 62, and 63, as illustrated in Fig. 8. The right hand support pin 62, is force-fitted through the right hand reed 60 and fits into a tapered recess drilled into the right hand edge of the grating support plate 52, while two left hand pins 63 are force-fitted into the left hand reed 60 and fit into two tapered recesses drilled into a small block 64, mounted on the left hand side of the grating support plate 52.

In order to oscillate or shift the grating screen 51 across the optic axis, a circular eccentric 65 is mounted on the right end of the shaft 35 between the reeds 60, as shown in Figs. 1 and 6. In the position of the eccentric 65 shown in Fig. 6, the overlap zone 58 of the grating screen 51 coincides with the optic axis. On rotation of the eccentric 65 the reeds 60 are alternately flexed to the right and left, as indicated by the broken lines, thereby oscillating the grating screen 51 therewith, and alternately shifting the grating sections 54 and 55 back and forth through the optic axis of the sector photometer 25.

As will appear more fully hereinafter, during the phase of operation of the sector photometer 25 when one of the grating sections 54 or 55 is positioned in the optic axis, it is desired that the slot openings defined by this particular grating section shall be uniformly illuminated by the light beam 27, while during an equal period when the other grating section is positioned in the optic axis, it is desired that the light energy passing through the slot openings defined by this grating section be graduated from the top to the bottom of the grating. In the particular construction shown in the drawings, the grating section 54 has eleven slot openings, the light energy fluxes through which are graduated from the top to the bottom of the grating, while the grating section 55 includes ten slot openings which are uniformly illuminated. The uppermost slot opening in the grating section 54 is illuminated to the same extent as all of the openings of the uniformly illuminated grating section 55, while the remaining lower openings in the grating section 54 receive progressively less light energy as will appear below.

In order to uniformly illuminate the grating section 55, and to provide for the graduated light energy fluxes through the grating section 54, the apparatus includes a sector disc 66 (Fig. 5) which rotates in phase with the shaft 35. In the structure illustrated in the drawings the sector disc 66 is bolted on the left face of the eccentric 65 as shown in Fig. 1. The sector disc 66 is preferably cut from a brass sheet, and includes a sector opening 67 of uniform angular width, and a sector opening 70 of graduated annular width. It will be noted that the uniform sector opening 67 is preferably 100° in angular width, while the graduated sector opening 70 has eleven step-shaped sector openings ranging outwardly from 5° to 100° in angular width, as shown. Except for the 5° step or opening, the angular increment between the other ten openings is 10°.

The sector openings 67 and 70 should be carefully laid out and formed, as the accuracy of the sector photometer 25 is largely determined thereby. The total angles of the sector openings 67 and 70 need not be precisely 100°, but they should be precisely equal to each other. The depth d of each of the eleven sector steps in the graduated sector opening 70 should be substantially equal, as shown.

The sector disc 66 is so mounted on the eccentric 65, in respect to its angular position, that the center line of the uniform sector opening 67 cuts the optic axis of the sector photometer 25 in phase with the center line of the grating section 55, while the center line of the graduated sector opening 70 cuts the optic axis in phase with the center line of the grating section 54. This adjustment may be varied within limits when the grating sections 54 and 55 are greater than the minimum necessary width.

Furthermore, the uniform sector opening 67 and the graduated sector opening 70 are disposed 180° from one another, so that the sector fly wheel 46 may be so positioned on the hub or pulley 43 that its sector openings 50 are in alignment, respectively, with the uniform and the graduated sector openings 67 and 70. As the sector openings 50 in the sector fly wheel 46 are 110° each in angular width, complete illumination of both the uniform and graduated sector openings 67, and 70, respectively, in the sector disc 66 is insured due to this 10° margin.

After the sector disc 66 is bolted to the eccentric 65, this combination may be first statically and then dynamically balanced by adding sectors of solder (not shown) to the back surface of the sector disc 66.

In order to obtain spectral transmission data of different solutions or liquids in the sector photometer 25, a sample of the solution being tested and a standard solution, are alternately moved back and forth across the optic axis so as to cut through the light beam 27 in phase with the movement of the grating screen sections 54 and 55. To accomplish this, the apparatus includes a two compartment absorption cell 71 in which the sample and standard solutions may be carried. The absorption cell 71 is preferably formed of fused quartz and includes two compartments 72 and 73 separated by a partition 74. The use of fused quartz reduces the absorption of ultra-violet light by the cell walls to a minimum. Test and standard solutions are introduced into the compartments 72 and 73 through two openings 75 and 76 provided in the top of the cell 71.

In one particular embodiment, the walls of the absorption cell 71 are 2 mm. thick and the central partition 74 is about 1 mm. thick. The compartments 72 and 73 in this cell are 1.00 cm. in width thereby making the thickness of the liquid therein when filled 1.00 cm. The absorption cell 71 should be carefully constructed, especially in respect to uniformity of the compartments 72 and 73 making these as nearly identical as possible.

Figure 3:
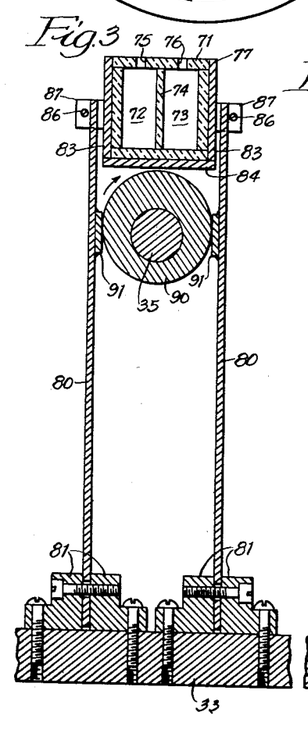
Figure 3 is a fragmentary vertical sectional view taken on line 3—3 of Figure 1.

In order to carry the absorption cell 71 in its movement back and forth across the optic axis of the sector photometer 25, a cage support 77 is provided therefor and this support is carried between the upper ends of a pair of tempered steel reeds 80, as shown in Fig. 1 and Fig. 3. Each of the reeds 80 is mounted on the base 33 between a pair of machined blocks 81 bolted thereto, as shown. The cage 77 comprises two side frames 82, a pair of end members 83 extending therebetween, and a bottom 84. A pair of ear sections 85 project integrally from the opposite vertical edges of each frame 82. Likewise, a pair of blocks 87 are welded onto opposite sides of each of the reeds. A pair of pins 86 pass through registering holes in each adjacent pair of ears 85 and blocks 87, as shown. In mounting, the cage 77 is slipped over the upper ends of the reeds 80 and the pins 86 inserted. The top ends of the reeds 80 fit between the pins 86 and are held in place thereby.

In order to drive or oscillate the cage support 77 and the absorption cell 71 carried therein back and forth across the optic axis, an eccentric 90 (Figs. 1 and 3) is adjustably mounted on the shaft 35 between the reeds 80 which are astride thereof. A pair of eccentric engaging blocks 91 are affixed on the inner faces of the reeds 80, as by soldering, in such position that they ride against the surface of the eccentric 90. The eccentric 90 is angularly aligned with the eccentric 65 so that the absorption cell 71 is oscillated across the optic axis both in phase with and in the same direction as the grating screen 51.

Figure 4:
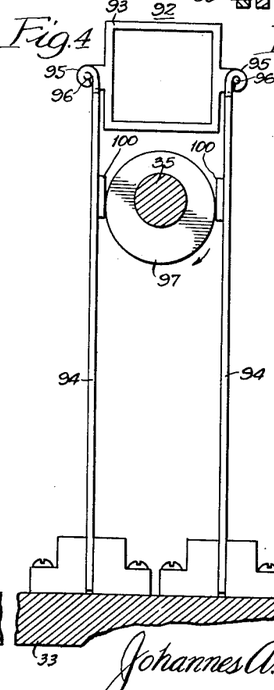
Figure 4 is a fragmentary, elevational view, partly in vertical section, taken on line 4—4 of Figure 1.

The vibration of the oscillating system comprising the cage 77 and absorption cell 71 is appreciable and should preferably be compensated for. Accordingly, a "dummy" oscillating system is provided having dynamical characteristics similar to that of the oscillating absorption cell 71 and associated parts. This dummy oscillating system is indicated generally at 92, and includes a dummy frame 93 carried between the upper ends of a pair of upright tempered steel reeds 94, as shown in Figs. 1 and 4. The upper ends of the reeds 94 are bifurcated and each pair of ends 95 are turned over a pair of support rods 96 horizontally mounted on opposite sides of the frame 93. The dummy frame 93 has a mass substantially equal to the sum of the masses of the cell cage 77 and the filled absorption cell 71. In one particular embodiment of the sector photometer 25, the weight of the dummy frame 93 is about 41 grams.

In order to drive the dummy oscillating system 92, an eccentric 97 is adjustably mounted on the drive shaft 35 between the reeds 94 which are astride thereof (Figs. 1 and 4). The eccentric 97 bears against a pair of blocks 100 rigidly affixed to the inner sides of the steel reeds 86 as by welding or soldering. The eccentric 97 is turned 180° on the shaft 35 in respect to the eccentric 90 which oscillates the absorption cell 71, so as to thereby oscillate the compensation system 92 at the same amplitude but 180° out of phase with the absorption cell 71. In this manner, substantially all of the vibratory forces of translation, and substantially all of the vibratory torques, excepting that about the vertical are compensated for. However, the vibratory torque about the vertical is small and need not be compensated for.

The optical system of the sector photometer 25 is so adjusted that the light beam 27 completely illuminates the full width of the slit 30 in the spectrograph 26. And, the sector disc 66 is so designed, and so aligned with the grating screen 51, that each of the eleven graduated sectors of light formed by the eleven sector steps in the graduated sector opening 70 falls on and shows through one of the eleven corresponding openings in the grating section 55.

In the particular embodiment referred to above the drive shaft 35 is driven by the motor 40 at a speed of about 30 R. P. S. which may be varied as the conditions demand. This speed is well above the critical frequency for ordinary conditions. The motor 40 may drive the shaft 35 and parts mounted thereon in either the clockwise or counterclockwise direction. But for purposes of description, the shaft 35 has been indicated in the drawings as rotating in a clockwise direction.

The operation of the sector photometer 25 is as follows: First, the two compartments 72 and 73 in the absorption cell 71 are filled, respectively, with the sample and standard solutions. In the particular embodiment shown, the absorption cell driving eccentric 90 and the grating screen driving eccentric 65 are similarly positioned on the shaft 35, and therefore the left hand cell compartment 72 cuts the optic axis in phase with the uniformly illuminated grating section 55, while the right hand cell compartment 73 cuts the optic axis in phase with the graduatedly illuminated grating section 54. For this reason, the sample of the solution being tested, is put in to the compartment 72, while the standard solution is put into the cell compartment 73, for reasons more apparent hereinafter.

It will be understood that either one of the eccentrics 65 or 90 may be turned 180° on the shaft 35 in respect to the other, in which case the cell compartment 72 would cross the optic axis in phase with the grating section 54 while the cell compartment 73 will cut the optic axis in phase with the grating section 55.

After the cell compartments 72 and 73 are thus filled and stoppered, the focusing of the light beam 27 is checked to determine that the interfitting sets of illuminated bands are properly formed on the slit 30 of the spectrograph 26; that is, the set of eleven spaced apart bands formed by passage of the light beam 27 through the grating section 54, and the set of ten spaced apart bands formed by its passage through the grating section 55. The motor 40 may now be started and the rotating parts of the apparatus brought to normal operating speed. Then the photographic plate in the spectrograph 26 may be exposed, the sector photometer 25 being kept running at normal speed throughout for the desired period of exposure. A typical exposure may last for 30 seconds or longer, and during this time many alternate exposures of the sample and standard solutions are made. It has been found that satisfactory work may be done with exposure times as low as 0.5 second.

Since each rotation of the shaft 35 produces one set of alternate exposures of the sample and standard solutions, each complete exposure comprises a series of these alternate exposures made in a cyclical manner, the number thereof depending upon the length of the period of exposure and the rate at which the shaft 35 is driven. This is a very important feature of the invention, because it provides an exposure method wherein any errors due to variation in intensity of the light source are substantially cancelled out. When the shaft 35 is driven at the speed of 30 R. P. S. one rotation thereof will take 1/30 of a second, and therefore each set of alternate exposures will be made during a period of 1/30 of a second.

Figure 9:
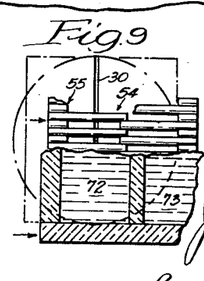
Figures 9 and 10 are fragmentary views, partly in vertical section, taken at right angles to the optic axis of the sector photometer at the line 3—3 of Figure 1 of the drawings, and showing two different operating phases of the sector photometer.

The cycle of operation during each complete rotation of the shaft 35 includes the following steps: Starting with the grating screen driving eccentric 65, the absorption cell driving eccentric 90, and the dummy compensatory system eccentric 97 in the positions shown in Figs. 3, 4, and 6 of the drawings, the vertical center lines of the grating screen 51, the absorption cell 71 and the dummy frame 93 will lie in the optic axis of the photometer 25, as shown. Upon one-quarter turn of the shaft 35 to the right, the eccentric 65 will move the grating screen 51 to its furthermost righthand position, while the absorption cell 71 is likewise simultaneously shifted to its furthermost righthand position by the eccentric 90. The positions of the grating screen 51 and absorption cell 71 in respect to the slit 30 of the spectrograph 26 after the first quarter turn of the shaft 35 is shown in Fig. 9. Since, the eccentric 97 is positioned 180° out of angular position with the eccentrics 65 and 90, the dummy frame 93 will be shifted to its furthermost lefthand position during this first 90° or quarter turn of the shaft 35 to the right.

On the second one-quarter turn of the shaft 35 to the right, the grating screen 51 will be returned to its central position, while the absorption cell 71 and dummy frame 93 likewise will be simultaneously returned to their central position. It will be seen that during this first one-half turn of the shaft 35 to the right, the grating section 55 and the cell compartment 72 will have cut through the optic axis of the sector photometer 25 to allow the light beam 27 to pass therethrough and through the sample solution in the cell compartment 72. Also during this one-half rotation of the shaft 35 to the right, the uniform sector opening 67 will have cut through the light beam 27 thereby dividing it into ten bands of equal light energy which are imaged on the slit 30 so as to in turn equally expose ten corresponding band areas on the photographic plate in the spectrograph 26.

Figure 10:
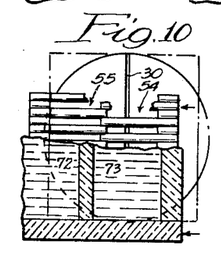

Continuing, on the third one-quarter turn of the shaft 35 to the right, the grating screen 51 will be shifted to its extreme lefthand position, while the absorption cell 71 is likewise simultaneously shifted to its furthermost lefthand position. The relative positions of the grating screen 51 and the absorption cell 71 in respect to the slit 30 after the three quarters revolution of the shaft 35 is shown in Fig. 10. And conversely, the dummy frame 93 will be simultaneously shifted to its extreme righthand position. And, on the fourth one-quarter turn of the shaft 35 to the right, making one complete rotation thereof, the grating screen 51, absorption cell 71 and dummy frame 93 will each be returned to its central and starting position.

It will be seen that during the second one-half turn of the shaft 35 to the right, as described, the grating section 54 and cell compartment 73 will have passed through the optic axis thereby allowing the light beam 27 to pass therethrough and through the standard solution in the cell compartment 73. Also coincident with the second one-half rotation of the shaft 35 to the right, the graduated sector opening 70 cuts the optic axis so as to form eleven light bands of graduated intensity which are imaged on the slit 30. These eleven light bands will expose eleven corresponding graduatedly exposed band areas on the photographic plate which interfit with the ten exposed band areas formed on the first one-half rotation of the shaft 35, as described above. During each successive rotation of the shaft 35, this same cycle of operation is repeated until the period of exposure has been completed.

Figure 11:
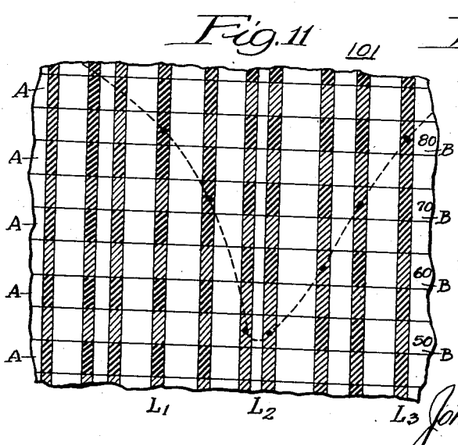
Figure 11 is a fragmentary plan view of a developed spectrographic plate illustrative of those obtainable with the various different embodiments of my invention.

Accordingly, when the photographic plate is developed, a number of interfitting contiguous band-shaped spectrograms of the sample and standard solutions will be obtained. In the particular embodiment described, there will be ten equally spaced apart spectrograms of the sample solution, with eleven equally spaced apart spectrograms of the standard solution interfitted and contiguous therewith. A section of a typically developed plate 101 thus obtained in the spectrograph 26, is shown in Fig. 11, and will be described below.

The principle of operation of the graduated sector opening 70 in the sector disc 66, as used in this connection, is well understood in the art.

That is, since the 100° sector step in the graduated sector opening 70 has the same angular width as the uniform sector opening 67, light energy passes through this sector step as it cuts the optic axis for a duration equal to that of light energy passing through the uniform sector opening 67. And, since the 90° sector step is only $\frac{9}{10}$ as wide as the 100° sector step, the amount of the light energy passing through this 90° arcuate step as it cuts the optic axis, will only be $\frac{9}{10}$ of that passing through the 100° sector step. Likewise, the amount of light energy passing through the 80° sector step will be equal to $\frac{8}{10}$ of that passing through the 100° sector step, the amount of light energy passing through the 70° sector step as it cuts the optic axis will be $\frac{7}{10}$ of that passing through the 100° sector step, etc.

It will be noted that since the sector opening 67 is of uniform angular width, the amount of light passing through each section thereof will be equal. Since the openings in the grating section 55 are uniformly illuminated on passage of the light beam 27 through the sector opening 67 in phase therewith, the light energy falling on the corresponding exposed band areas on the photographic plate will be equal in intensity and amount from top to bottom. Thus, each of these ten band areas will be substantially identical with the other nine. These equally exposed band areas of spectrograms formed by passage of the light beam 27 through the sample solution in the cell compartment 72, uniform sector opening 67 and grating section 55 are designated as A in Fig. 11. However, since the illumination of the eleven openings in the grating section 54 is graduated by passage of the light beam 27 through the graduated sector opening 70. The other set of exposed band areas of the photographic plate will receive graduated or relative amounts of light energy. These graduatedly exposed band areas or spectrograms formed by passage of the light beam 27 through the standard solution in the cell compartment 73, graduated sector opening 70 and grating section 54 are designated as B in Fig. 11. Each of the shaded rectangular areas in Fig. 11 represents ordinary spectrum lines.

For each wavelength, the amount of light transmitted by the sample is equal to, or less than that transmitted by the standard. If, at some wavelength, the transmittance of the sample is equal to the reduction factor associated with one of the band areas or spectrograms B of the plate 101, Fig. 11, the photographic density in the adjacent band areas A will match that of the band area B at that wavelength. Thus in the plate 101, Fig. 11, the photographic density of the 80 percent band matches that of adjacent A bands at wavelengths $L_1$ and $L_3$; hence, at these wavelengths, the transmittance of the sample is 80 percent. It is seen, then, that spectral transmittance data may be obtained by locating the match points on the photographic plate, and noting the transmittances and wavelengths associated with those match points. Several match points are shown in the section of the photographic plate 101, which indicate a maximum of absorption of light at a wavelength $L_2$.

The amplitude of the oscillation of the grating screen 51 and absorption cell 71 is determined by the width of the light beam accepted by the spectrograph 26, and the width of the solid zone 58 between the grating sections 54 and 55, and the width of the partition 74 between cell compartments 72 and 73. The one-half width of the light beam 27 at the grating screen 51 may be of the order of 0.0035", or less, while that of the zone of the overlap 58 of the long grating rods 57 is of similar order. Thus, an amplitude of 0.03" should be more than adequate for satisfactory operation (0.03 cos 50°=0.02" is the approximate displacement when the edge of the 100° sector cuts the optic axis). The one-half width of the light beam 27 at the double absorption cell 71 is about 0.02", and that of the partition 74 is about 0.04". Thus an amplitude of 0.12" should be more than adequate, (0.12 cos 50°=0.077").

While exposures of the sample and standard solutions are not strictly simultaneous, errors due to alternate exposures are substantially nil because the sample and standard oscillate at a rate of about 30 complete oscillations per second. Therefore, the time of each oscillation is $\frac{1}{30}$ of a second, and the change in intensity of the light source occurring in this time is extremely small, if any. However, even if this short period for one complete oscillation were substantially larger, or there was a slight change in light intensity therein, there are so many alternate exposures during a typical run or test that the average intensity of the light beam 27 is the same for both the sample and standard.

The sector photometer 25 may be used for determining spectral transmittance properties of different solids. For example, the spectral transmittance properties of optical filters may be determined by substituting an optical filter for the double quartz absorption cell 71 carried in the cage 77. The filter is cut to occupy only that half of the cage 77 which is normally occupied by the sample half 72 of the two-compartment absorption cell.

Figures 12, 16, 17:
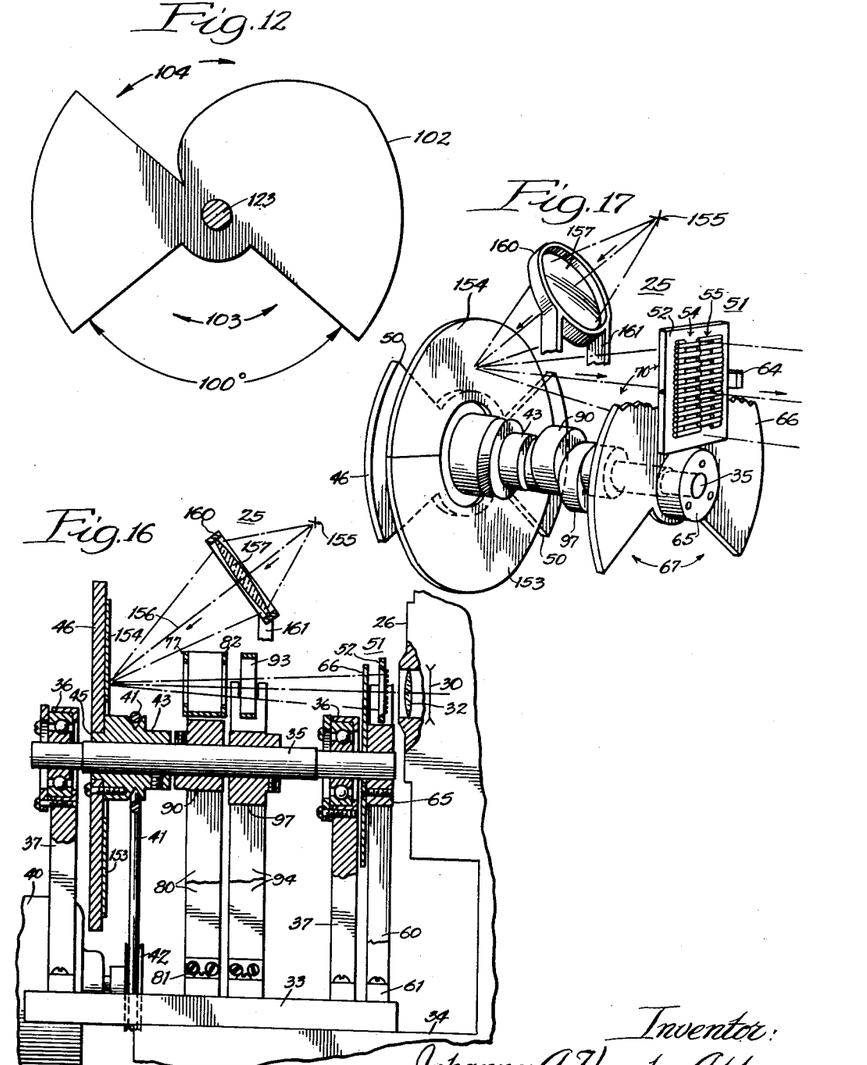
Figure 12 is an elevational view of a sector disc of alternate form which may be used in place of the sector disc shown in Figure 5.
Figure 16 is a side elevational view, partly in vertical section, of the multi-step sector photometer of Fig. 1 modified for use in obtaining spectral reflectance data.
Figure 17 is a stripped, perspective view of the modified sector photometer of Figure 16 of the drawings.

The sector disc 66, Fig. 5, may be replaced with a sector disc 102, of an alternate form, as shown in Fig. 12. The sector disc 102 may be formed from a metal sheet with a sector opening 103 of uniform angular width and a sector opening 104 of graduated angular width cut therein. The graduated sector opening 104 is operatively equivalent to the graduated sector opening 70 of the sector disc 66, Fig. 5. However, instead of both edges of the graduated sector opening 104 being step-wise graduated, the left edge is straight while the right edge alone is graduated in the form of a smooth curve. It will be understood that the graduated sector openings 70 and 104 in the sector discs 66 and 102, respectively, may be graduated in a regular manner as shown, or they may be logarithmically graduated if this particular type of graduation is required.

Figure 13:
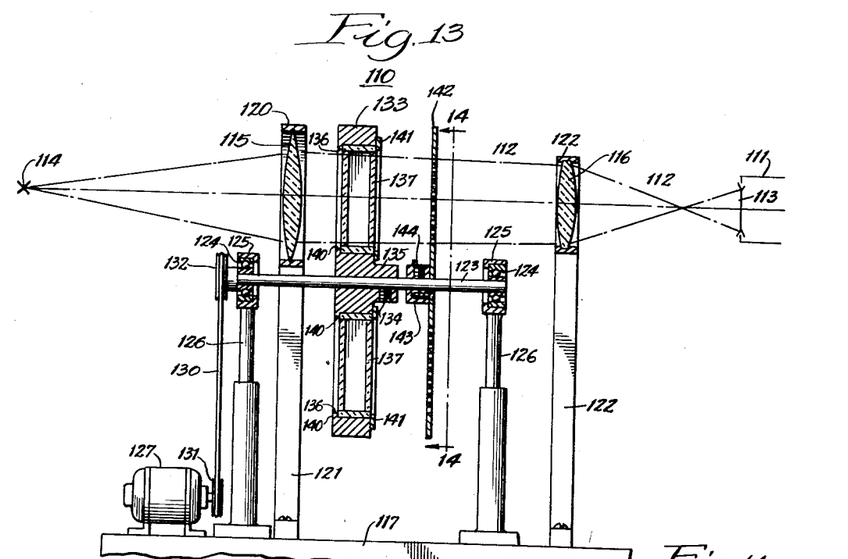
Figure 13 is a side elevational view, partly in vertical section, of a multi-step sector photometer illustrating another embodiment of my invention for use in obtaining spectral transmittance data.
Figure 14:
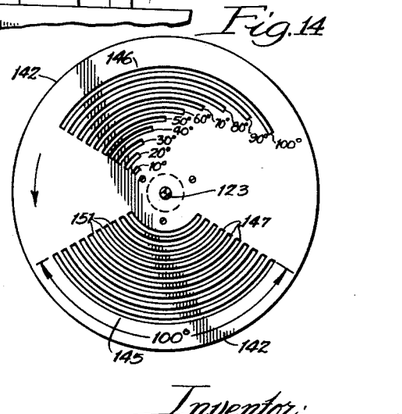
Figure 14 is an elevational view taken on the line 14—14 of Figure 13 and illustrates a sector grating disc forming a part of my invention.
Figure 15:
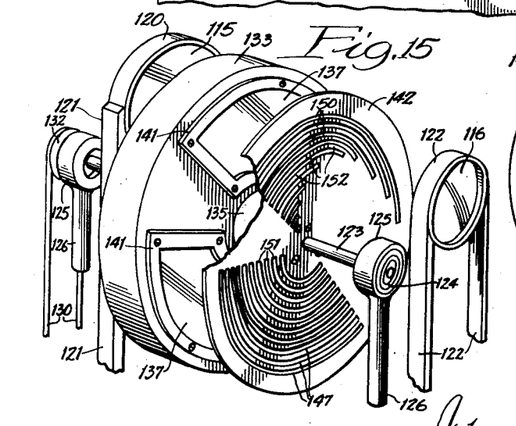
Figure 15 is a fragmentary, perspective view showing the main operating parts of the multi-step sector photometer shown in Figure 13 of the drawings.

Another form of the sector photometer of my invention adapted for use in obtaining spectral transmittance data is shown in Figs. 13, 14, and 15. This embodiment of the invention, while equivalent in general operational characteristics to the apparatus just described utilizes a rotating carrier for the standard and the test sample. The apparatus, which is indicated generally at 110, may be used in connection with a spectrograph of any suitable standard type such as is indicated diagrammatically at 111, similarly to the spectrograph 26 of the previously described embodiment.

The sector photometer 110 is mounted on the front of, and in optical alignment with, the spectrograph 111 so that a light beam, indicated diagrammatically at 112, passing along the optic axis of the sector photometer 110 will enter the slit 113 of the spectrograph 111. The light beam 112 may be emitted from an iron arc or other source, indicated diagrammatically at 114 positioned at the left end of the sector photometer 110.

A lens 115 collects light energy from the source 114 and directs it along the optic axis of the sector photometer 110 in the form of a collimated light beam 112, as shown. After the light beam 112 passes through the sector photometer 110, it enters the spectrograph 111 through a lens 116 mounted in front of the slit 113. The lens 116 serves to form sharp images on the slit 113 of the different bands into which the light beam 112 is divided on passage through the sector photometer 110 as will be described hereinafter. The optic axis of the photometer is in optical alignment with the optic axis (and hence with the collimating system) of the spectrograph 111.

The structural parts of the sector photometer 110 include a base 117 which may be directly attached to the base or frame of the spectrograph 111 in suitable manner. The base 117 serves to carry or support the different elements and parts of the sector photometer 110.

The collimating lens 115 is carried in a ring 120 supported from the base 117 by a pair of upright members 121, as shown. The imaging lens 116 is likewise supported in a ring 122 supported from the base 117 by another pair of upright supports 122.

In order to provide for the rotatable mounting and driving of the rotatable parts of the sector photometer 110, a drive shaft 123 is mounted at the opposite ends thereof in a pair of bearings 124, in substantially parallel alignment with and below the optic axis. The bearings 124 are preferably of the ball-bearing type, as shown, and are suitably carried in a pair of bearing sockets or housings 125 provided on the top ends of a pair of upright bearing supports 126. The upright bearing supports 126 are suitably fastened on the base 117.

The shaft 123 and the rotatable parts of the photometer 110 are driven by a motor 127 mounted on the left end of the base 117. The motor 127 is connected in driving relationship with the shaft 123 by means of an endless belt 130 running over the driving pulley 131 of the motor 127 and a pulley 132 provided on the left end of the shaft 123.

The rotary carrier means provided for alternately moving the sample and standard solutions through the optic axis of the sector photometer 110, includes a relatively wide sector wheel 133 mounted on the shaft 123 to the right of the collecting lens 115. The wheel 133 is adjustably fixed to the shaft 123 by means of a set screw 134 provided in the hub 135 thereof.

A pair of sector-shaped windows 136 are formed in the wheel 133 in which a pair of fused quartz absorption cells 137, for carrying the spectral sample and standard solutions, may be mounted. The sector windows 136 are positioned substantially 180° from each other. The cells 137 are retained in position by integral flanges 140 formed around the left sides of each of the windows 136 in cooperation with a pair of retaining frames 141, which may be bolted to the right face of the wheel 133 after the cells 137 are in place, as shown.

In order to divide the light beam 112 into a number of bands after passage through the cells 137, so as to alternately form two sets of regularly spaced illuminated bands on the slit 113 and provide for obtaining complete spectral transmittance data in one exposure period, a sector grating disc 142 is mounted on the shaft 123 to the right of the cell carrying wheel 133. The sector grating disc 142 may be bolted to the right face of a hub 143 adjustably positioned on the shaft 123 by a set screw 144, as shown.

The sector grating disc 142 (Fig. 14) has a sector grating 145 of uniform angular width and a sector grating 146 of graduated angular width formed therein at 180° angular displacement from each other. The sector grating 145 may be formed by cutting out ten arcuate bands from the disc 142 to thereby leave ten equally spaced arcuate openings 147 of equal width. Each of these arcuate openings 147 is 100° in angular width.

The graduated sector grating 146 may be formed by cutting ten equally spaced arcuate openings 150 of graduated angular width from the disc 142. Each of the graduated arcuate openings 150 is in circular continuation alignment with the arcuate bars 151 of the uniform sector grating 145 and, conversely, each of the uniform arcuate openings 147 is in circular continuation alignment with the bars 152 in the graduated sector grating 146. As illustrated in Figure 14, the ten openings 150 in the graduated sector grating 146 range outwardly from 10° to 100° in angular width there being a 10° difference between adjacent openings.

The cell carrying wheel 133 and the sector grating disc 142 are so positioned on the shaft 123 in relationship with each other that the uniform sector grating 145 is in optical alignment with one of the cells 137, while the graduated sector grating 146 is in optical alignment with the other of the cells 137. That is to say, the particular diameter of the sector disc 142 which passes through the center lines of the uniform and graduated sector openings 145 and 146 is substantially aligned with the diameter of the wheel 133 which passes through the center lines of the sector windows 136. The angular width of the cells 137 is somewhat greater than 100° so that optically these cells will completely cover or overlap the uniform and graduated sector gratings 145 and 146 respectively.

It will be understood that the uniform sector grating 145 need not necessarily be 100° in angular width, but may be of any other satisfactory angular dimension. Whatever the dimension is, the graduated sector grating 146 may be graduated accordingly into ten different openings, or other number desired.

The drive shaft 123 is preferably driven by the motor 127 at a speed of about 30 R. P. S., which may be varied as the conditions require. This speed, as stated before, in connection with the operation of the sector photometer 25, Fig. 1, is well above the critical frequency for ordinary conditions. The motor 127 may drive the shaft 123 and cell carrying wheel 133 and grating disc 142 mounted thereon, in either the clockwise or counterclockwise direction. For purposes of description, the direction of rotation of the shaft 123 is indicated as counterclockwise viewed from the right of Fig. 13.

The operation of the sector photometer 110 is as follows: First, the particular absorption cell 137 which is in alignment with the uniform sector grating 145 is filled with a sample of the solution being tested for its spectral transmittance properties, while the other absorption cell 137 which is in alignment with the graduated sector opening 146 is filled with the spectral standard solution. The focusing of the light beam 112 is checked to determine that the two sets of bands will be formed in sharp outline on the slit 113 in the spectrograph 111, and then the motor 127 is started bringing the sector photometer 110 up to full operating speed. The photographic plate in the spectrograph 111 may now be exposed for the desired period, while the sector photometer 110 is kept running. After the desired period of exposure, the sector photometer 110 is stopped, and the photographic plate is ready to be developed.

A typical exposure may last for thirty seconds and since each rotation of the shaft 123 produces one set of alternate exposures of the sample and standard solution, each complete exposure comprises a series of these alternate exposures made in a cyclical manner, the number thereof depending upon the length of the period of exposure and the rate at which the shaft 123 is driven. When the shaft 123 is driven at the speed of 30 R. P. S., one rotation thereof will take 1/30 of a second, and therefore one set of alternate exposures will be made in 1/30 of a second, as previously outlined in connection with the operation of the sector photometer 25 (Fig. 1).

During each revolution of the shaft 123, the uniform sector grating 145 cuts the optic axis in phase with the sample solution contained in one of the absorption cells 137 during one-half of the revolution, and then in the second half of the same revolution the graduated sector grating 146 cuts the optic axis in phase with the standard solution contained in the other of the absorption cells 137. It will be understood that when the light beam 112 passes through the sample solution and uniform sector grating 145, a number of regularly spaced and equally illuminated light bands will be projected upon the slit 113 of the spectrograph 111. And in turn, ten corresponding band-shaped areas will be equally exposed on the photographic plate in the spectrograph 111.

During the next half of this revolution, when the light beam 112 passes through the standard solution and graduated sector grating 146 an alternate set of ten light bands will be projected upon the slit 113 in the positions previously occupied by the darkened areas of the set of light beams formed on passage through the sample solution. That is, since the arcuate openings of each sector grating 145 and 146 are in circular continuation alignment with the arcuate bars of the other sector grating, the bands of light formed thereby will interfit on the slit 113 of the spectrograph 111.

Since the openings 150 in the graduated sector grating 146 are graduated in angular width, the light energies passing through the bands formed during this second half of a revolution will be graduated from top to bottom. That is, the outermost arcuate opening 150, being 100° in angular width, the light band coming therethrough will be illuminated for the same length of time as each of the ten light bands formed by the uniform sector grating 145 during the first half of the revolution, while, the light band formed by the 90° arcuate opening will be illuminated only 9/10 as much as the light band projected through the 100° arcuate opening. Similarly, the light band formed by the 80° arcuate opening will be illuminated 8/10 as much as that formed by the 100° arcuate opening, etc.

Accordingly, during this second half of one revolution when the light beam 112 is passing through the standard solution, a set of ten bandshaped areas will be graduatedly exposed on the photographic plate, interfitting and contiguous with the ten exposed areas formed on passage of the light beam 112 through the sample solution. When the photographic plate thus obtained in the spectrograph 111 by use of the sector photometer 110 is developed, it will be similar to the developed photographic plate 101 shown in Fig. 11.

An important and novel feature of the sector photometer 110 is the centrifugal action obtained by rapid rotation of the absorption cells 137 carried in the wheel 133. This centrifugal action causes heavier suspended particles to be thrown to the outer walls of the absorption cells 137 away from the shaft 123. Also, air bubbles, which occasionally form in the solutions in the absorption cells 137, will be forced to the inner walls of the absorption cells 137 toward the shaft 123. Accordingly, liquids or solutions contained in the absorption cells 137 are clarified during the operation of the sector photometer 110, which is frequently a particularly desirable feature.

If desired, the size of the absorption cells 137 may be reduced by introducing in the optic axis of the sector photometer 110 on opposite sides of the wheel 133, two lenses which would serve to reduce the light beam 112 to a small cross section at the position of the rotating cells 137 and to bring it up to size again before passage through the sector grating disc 142.

Although the disc 142 (Fig. 14) may be formed without undue difficulty, in certain instances it may be advantageous to replace it with the combination of a shiftable grating screen and a sector disc. That is, the disc 142 (Fig. 15) could be replaced by the two section grating screen 51 and the sector disc 66, the operation of which combination could be coordinated with the rotation of the cell carrying wheel 133. It will be seen that the combination of the shiftable grating screen 51 and open sector disc 66 is functionally equivalent to the disc 142.

A very important application to which the sector photometers embodying my invention may be advantageously put is the measurement of spectral reflectance or diffuse reflectance of solids. One particular application in this connection is the investigation of the spectral reflectance of different grades and types of papers in the ultra violet region. The application of the sector photometer 25, Fig. 1, in this particular connection will be described in connection with Figs. 16 and 17.

In order to make spectral reflectance tests of papers with the sector photometer 25, the double compartment absorption cell 71 is removed. The paper sample to be tested is cut in the form of a wide annulus, one-half of which is discarded, and the other half 153, Fig. 17, is mounted on the right face of the sector flywheel 46 over the sample half thereof. The half annulus paper sample 153 may be glued to the sector fly wheel 46, or otherwise suitably secured thereto. The other half of the fly wheel 46 is covered with a spectral reflectance standard, which may be a similar one-half annulus 154 and cut from a light cardboard and smoked with magnesium oxide or other known standard.

To illuminate the sample and the standard 153 and 154, respectively, a small iron arc or other light source, as indicated diagrammatically at 155, may be placed adjacent the photometer 25 whereby a light beam can be projected therefrom upon the reflectance sample and standard. The light beam projected from the source 155 is indicated diagrammatically at 156 and as illustrated, passes through a quartz condenser lens 157 which serves to focus the light beam 156 into a small, intensely illuminated spot which alternately illuminates corresponding areas of the reflectance sample 153 and reflectance standard 154.

The quartz condenser lens 157 may be mounted in a retaining ring 160 carried on and between the top ends of a pair of upright support members 161, as shown. The light source 155 and quartz condenser lens 157 are preferably aligned so that the light beam 156 strikes the reflectance sample 153 or reflectance standard 154 at an angle of incidence of about 45°. The light beam 156 is reflected down the optic axis on the sector photometer 25 through the grating screen 51 and into the slit 30 of the spectrograph 26 as diagrammatically indicated.

The spectral reflectance sample 153 is mounted over that opening 50 of the sector flywheel 46, which is in alignment with the uniform sector opening 67 in the sector disc 66. That is to say, it is mounted over the sample half of the sector fly wheel 46. And, the spectral reflectance standard 154 is mounted over the opening 50 in the sector fly wheel 46 which is in alignment with the graduated sector opening 70 of the sector disc 66. That is, it may be said to be mounted over the standard half of the sector fly wheel 46. Accordingly, during one half of each rotation of the shaft 35, the light beam will be reflected from the spectral reflectance sample 153 through the uniform sector opening 67 and the grating section 55. The light beam 156 will be split into ten different bands on passage through the grating section 55 which will be imaged upon the slit 30 of the spectrograph 26. The amount of light making up each of these ten bands will be the same since they were formed by the passage of the light beam 156 through the uniform sector opening 67. And, in turn, ten band shaped areas will be equally exposed on the photographic plate in the spectrograph 26.

During the other half of each rotation of the shaft 35, the light beam 156 will be reflected from the spectral reflectance standard 154 down the optic axis of the sector photometer 25 through the graduated sector opening 70 and grating section 54. The grating section 54 splits the light beam 156 into 11 bands on passage therethrough. The amount of light comprising each of the eleven light bands is graduated from top to bottom due to passage through the graduated sector opening 70. These 11 graduated light bands will be imaged upon the slit 30 of the spectrograph 26, and in turn 11 corresponding band shaped areas will be graduatedly exposed on the photographic plate therein, which interfit with the first set of ten equally exposed band areas. The period of exposure will include a plurality of these alternate exposures of the spectral reflectance sample 153 and spectral reflectance standard 154.

After the desired period of exposure, the photographic plate is developed and an inspection of the matched points gives the wave lengths at which the spectral reflectance sample 153 had 5, 10, 20 . . . 90% of the reflectance of the magnesium oxide or other standard.

Figure 18:
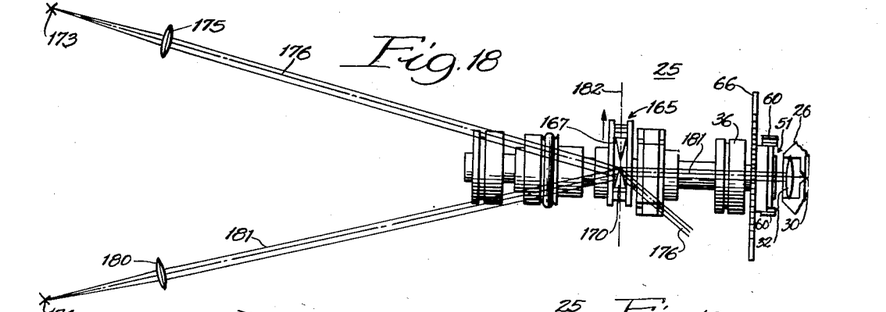
Figure 18 is a partially diagrammatic, top plan view of the multi-step sector photometer of Fig. 1 modified for use in taking spectroradiometry data and illustrating still another embodiment of my invention.
Figure 19:
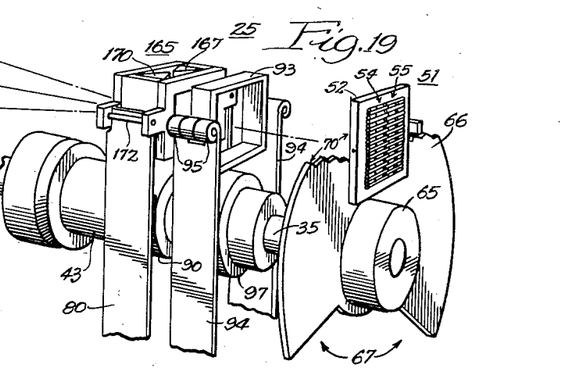
Figure 19 is a fragmentary, perspective view of the modified sector photometer of Figure 18 of the drawings.

Another important application of the sector photometers embodying my invention is use in connection with the determination of relative spectral energy distribution of an unknown light source. The sector photometer 25, Fig. 1, is readily adaptable to make such determinations with very little change. The sector photometer 25 as shown in Fig. 1 is made ready for the determination of relative spectral energy distribution by removing the sector fly wheel 46, and replacing the absorption cell 71 and the cage 77 with a prism holder 165, as shown in Figs. 18, 19, and 20.

Figure 20:
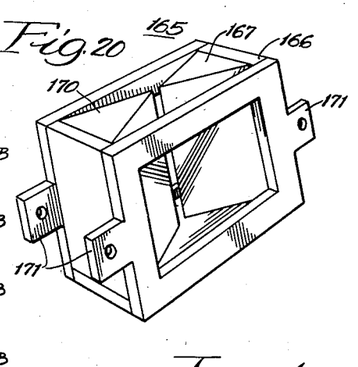
Figure 20 is a perspective view of a prism holder arrangement used in the sector photometer shown in Figure 18 of the drawings.

The prism holder 165 comprises a frame or cage 166, similar in construction to the cage 77, Fig. 3, in which are mounted two small angle prisms 167 and 170 in mirror image relationship, as shown in Fig. 20. The cage 166 may have the same dimensions as the cage 77, Fig. 3, so that it may be readily placed over the top ends of the steel reeds 80 and retained in place thereon by pins 172 passing through integral ears 171 provided on each side of the cage 166. The prism holder 165 including the cage 166 and the prisms 167 and 170 has a mass substantially equal to the mass of the dummy frame 93 so that the forces of vibration will be compensated for in the manner outlined above.

The cam 90 oscillates the prism holder 165 back and forth across the optic axis of the sector photometer 25 in the same manner that the absorption cell 71 is oscillated, as described above in connection with Fig. 1. Accordingly, the prism 167 cuts through the optic axis in phase with the grating section 55, while the prism 170 cuts the optic axis in phase with the grating section 54. And likewise, the prism 167 cuts the optic axis in phase with the uniform sector openings 67 in the sector disc 66, while the prism 170 cuts the optic axis in phase with the graduated sector opening 70.

In order to determine the relative spectral energy distribution of an unknown light source, a beam of light from this unknown light source is directed along the optic axis of the sector photometer 25 alternately with a beam of light from a standard light source. Referring particularly to Fig. 18, an unknown light source is indicated diagrammatically at 173. A lens 175 focuses a light beam indicated diagrammatically at 176, from the unknown light source 173, into the sector photometer 25, and a similar lens 180 focuses a light beam 181 from the standard light source 174 into the sector photometer 25. The lenses 175 and 180 are so adjusted that the light beams 176 and 181 enter the sector photometer 25 at substantially the point where the vertical central plane of the prism holder 165, indicated diagrammatically by the line 182, cuts the optic axis. The lenses 175 and 180 may be omitted, and are employed only for the purpose of reducing exposure time.

The light beams 176 and 181 alternately fall upon the prisms 167 and 170 as the same are oscillated in the prism holder 165. The angles of incidence at which the light beams 176 and 181 strike the prisms 167 and 170 are such that they will alternately be deviated down the optic axis of the sector photometer 25. That is, in the particular construction and arrangement shown, when the standard light beam 181 strikes the prism 170, it will be deviated down the optic axis of the sector photometer 25 while the light beam 176 striking the same prism 170 is deviated to the right and out of the sector photometer 25, as shown in Fig. 18. Conversely, when the prism 167 is in the optic axis, the light beam 176 will be deviated into coincidence with the optic axis of the sector photometer 25 while the light beam 181 will be deviated to the left and out of the sector photometer 25.

Figures 21, 22:
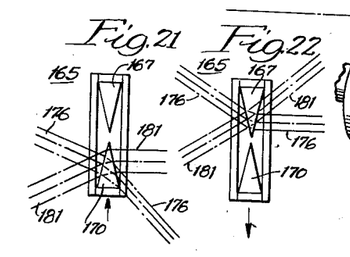
Figures 21 and 22 are diagrammatic views showing the manner in which the prism arrangement of Figure 20 bends or deviates a pair of light beams along the optical axis of the sector photometer shown in Figure 18 of the drawings.

These two alternate phases of operation are shown diagrammatically in Figs. 21 and 22. In Fig. 21, the light beam 181 is shown falling on the prism 170, which is in the optic axis, and after passage therethrough being deviated into coincidence with the optic axis. Simultaneously, the light beam 176 falls on the prism 170 and is deviated still further to the right so as not to interfere with the passage of the light beam 181 through the sector photometer 25.

Alternately, as shown in Fig. 22, the light beam 176 falls on the prism 167 lying in the optic axis and is deviated by passage therethrough into coincidence with the optic axis. In this phase the light beam 181 falls on the prism 167 and is turned to the left on passage therethrough so as not to interfere with the passage of the light beam 176 through the sector photometer 25.

It will be seen that the light beam 181 passes through the graduated sector opening 70 and the grating section 54 so as to be split into 11 light bands of graduated amounts of light energy. As hereinbefore stated these light bands formed on the slit 30 will graduatedly expose 11 corresponding band areas on the photographic plate in the spectrograph 26.

The light beam 176 on being deviated through the sector photometer 25 passes through the uniform sector opening 67 and is divided into ten light bands of equal light energy on passage through the grating section 55. These 10 equally illuminated light bands are formed on the slit 30 and in turn expose 10 corresponding band areas on the photographic plate, which interfit with the 11 graduatedly exposed band areas. After the proper period of exposure, during which a plurality of these alternate exposures of the unknown light source 173 and standard light source 174 are made, the photographic plate may be developed and the spectrograms compared for match points to determine the relative spectral energy distribution of the unknown light source 173.

Still another important application to which the sector photometers embodying my invention may be put is in connection with quantitative spectroscopic analysis. To adapt the sector photometer 25 for this use the quartz absorption cell 71 is removed, and a carbon arc is placed a few feet from the slit 30 of the spectrograph 26 in continuation alignment with the optic axis. The sample half of the sector fly wheel 46 is covered with an opaque annulus and, a very small, known, amount of a given element is burned in the carbon arc with the sector photometer 25 running. It will be seen that only the standard zones of relative exposures, 100, 90, 80, etc. are exposed on the photographic plate in the spectrograph 26, as the light beam only passes through the graduated sector opening 70.

After this exposure obtained by burning a known amount of a particular element in the arc, the opaque annulus is removed from the sample half of the sector fly wheel 46 and used to cover the standard half thereof. Then a predetermined amount of the sample being investigated is burned in a carbon arc with the light beam passing through the uniform sector opening 67 thereby exposing a set of uniform sample zones which interfit with the standard zones.

If the known amount of the element burned is greater than that occurring in the sample, the lines of one of the standard zones on the developed plate due to the element under investigation will match, or approximately match the adjacent lines of the neighboring sample zones. If no match is found, the known amount of the element burned was smaller than that in the unknown, and another pair of exposures is made, using a larger known amount.

Since the light energy in the lines due to the element under investigation will be proportional to the amount of that element consumed in the arc, an approximation of the amount of unknown may be readily obtained. For example, suppose that 3.0 micrograms of the element are burned as a standard, and that the lines of the sample zones match most closely the 70% standard zone. Then, the amount of unknown present in the sample is approximately 2.1 micrograms.

A very important feature of the sector photometers of my invention is the minimum of optical equipment required. This not only greatly reduces the cost of the apparatus, but also reduces the absorption of ultra violet light. When the sector photometer 25 is used for spectral transmittance investigations, as described in connection with Figs. 1 through 11, no optical equipment is required except the quartz cell 71 which contains the sample and standard solutions. When the sector photometer 25 is used for measurements of diffuse reflectance, as described in connection with Figs. 16 and 17, the only optical equipment required is the quartz condenser lens 157. Likewise, when the sector photometer 25 is used for measurement of relative spectral energy distribution, as described in connection with Figs. 18 and 19, the only optical equipment required is the pair of deviating prisms 167 and 170.

Since further changes may be made in the foregoing constructions and different embodiments of my invention may be made without departing from the scope thereof, it is intended that all matter described hereinbefore or shown in the accompanying drawings shall be interpreted as illustrative and not in a limiting sense.

I claim the following as my invention:

1. In apparatus of the class described, in combination, means providing a sector opening of uniform angular width; means providing a sector opening of graduated angular width; means for mounting a sample, the spectral properties of which are to be examined, in optical alignment with said uniform sector opening; means for mounting a spectral standard in optical alignment with said graduated sector opening; a light source providing a light beam; and, means providing relative movement between said light source and said spectral sample and standard, whereby said light beam passes alternately through said spectral sample and said uniform sector opening in alignment therewith and then through said spectral standard and said graduated sector opening in alignment therewith.

2. In apparatus of the class described, in combination, means providing a sector opening of uniform angular width, means providing a sector opening of graduated angular width, means for passing said uniform and graduated sector openings in succession across the optic axis of said apparatus, means for mounting a sample the spectral properties of which are to be examined, means for passing said sample across said optic axis in phase with said sector opening of uniform angular width, means for mounting a standard to which the spectral properties of said sample are to be referred, and means for passing said spectral standard across said optic axis in phase with said sector opening of graduated angular width.

3. In apparatus of the class described, in combination, means for directing a light beam along the optic axis of the apparatus, means providing a sector opening of uniform angular width, means providing a sector opening of graduated angular width, means for passing said uniform and graduated sector openings in succession across the optic axis of said apparatus, means for mounting a sample the spectral properties of which are to be examined, means for passing said sample across said optic axis in phase with said sector opening of uniform angular width, means for mounting a standard to which the spectral properties of said sample are to be referred, and means for passing said spectral standard across said optic axis in phase with said sector opening of graduated angular width.

4. In apparatus of the class described, in combination, a sector disc having a sector opening of uniform angular width and angularly displaced therefrom a sector opening of graduated angular width, means for rotatably mounting said sector disc so that on rotation thereof said uniform and graduated sector openings cut the optic axis of said apparatus, means for driving said sector disc, a two-sectional grating screen having the opaque portions of each section in alignment with the openings of the other section, means for mounting said grating screen for oscillatory movement across said optic axis, means for oscillating said grating screen so that one of said grating sections cuts said optic axis in phase with said uniform sector opening while the other grating section cuts said optic axis in phase with said graduated sector openings, a two-compartment cell, means for mounting said cell for oscillatory movement across said optic axis, and means for oscillating said cell so that one of said compartments cuts said optic axis in phase with said uniform sector opening while the other of said compartments cuts said optic axis in phase with said graduated sector opening.

5. In apparatus of the class described, in combination, a shaft rotatably mounted in suitable bearings in substantially parallel alignment with the optic axis of said apparatus, motor means for driving said shaft, a sector disc fixedly co-axially mounted on said shaft having a sector opening of uniform angular width and angularly spaced therefrom a sector opening of graduated angular width, said uniform and graduated sector openings cutting said optic axis on rotation of said sector disc, a two-sectioned grating screen having the opaque portions of each section in alignment with the openings of the other section, first reed means astride said shaft for mounting said two-sectioned grating screen for oscillatory movement across said optic axis, first cam means mounted on said shaft between said first reeds for oscillating said grating screen so that one of said grating sections cuts the optic axis in phase with said uniform sector opening while the other grating section cuts said optic axis in phase with said graduated sector opening, a two-compartment cell, second reed means astride said shaft for mounting said cell for oscillatory movement across said optic axis, and second cam means mounted on said shaft between said second reeds for oscillating said cell so that one of said compartments thereof cuts said optic axis in phase with said uniform sector opening while the other compartment cuts said optic axis in phase with said graduated sector opening.

6. In apparatus of the class described, in combination, a shaft rotatably mounted in suitable bearings in substantially parallel alignment with the optic axis of said apparatus, motor means for driving said shaft, a sector disc fixedly co-axially mounted on said shaft having a sector opening of uniform angular width and angularly spaced therefrom a sector opening of graduated angular width, said uniform and graduated sector openings cutting said optic axis on rotation of said sector disc, a two-sectioned grating screen having the opaque portions of each section in alignment with the openings of the other section, first reed means astride said shaft for mounting said grating screen for oscillatory movement across said optic axis, first cam means mounted on said shaft between said first reeds for oscillating said grating screen so that one of said grating sections cuts the optic axis in phase with said uniform sector opening while the other grating section cuts said optic axis in phase with said graduated sector opening, a two-compartment cell, second reed means astride said shaft for mounting said cell for oscillatory movement across said optic axis, second cam means mounted on said shaft between said second reeds for oscillating said cell so that one of said compartments thereof cuts said optic axis in phase with said uniform sector opening while the other compartment cuts said optic axis in phase with said graduated sector opening, a vibration compensating mass having dynamical characteristics similar to said oscillating two-compartment cell, third reed means astride said shaft for mounting said compensating mass for oscillatory movement, and third cam means mounted on said shaft between said third reeds for oscillating said vibration compensating mass 180° out of phase with said cell.

7. In apparatus of the class described, the combination of a sector disc having a sector opening of uniform angular width and angularly displaced therefrom a sector opening of graduated angular width, means for rotatably mounting said sector disc so that on rotation thereof said uniform and graduated sector openings cut the optic axis of said apparatus, means for driving said sector disc, a two-sectioned grating screen having the opaque portions of each section in alignment with the openings of the other section, means for mounting said grating screen for oscillatory movement across said optic axis, and means for oscillating said grating screen so that one of said grating sections cuts said optic axis in phase with said uniform sector opening while the other grating section cuts said optic axis in phase with said graduated sector opening.

8. In apparatus of the class described, the combination of a shaft rotatably mounted in suitable bearings in substantially parallel alignment with the optic axis of said apparatus, motor means for driving said shaft, a sector disc fixedly co-axially mounted on said shaft having a sector opening of uniform angular width and angularly spaced therefrom a sector opening of graduated angular width, said uniform and graduated sector openings cutting said optic axis on rotation of said sector disc, a two-sectioned grating screen having the opaque portions of each section in alignment with the openings of the other section, reed means astride said shaft for mounting said grating screen for oscillatory movement across said optic axis, and cam means mounted on said shaft between said reeds for oscillating said grating screen so that one of said grating sections cuts the optic axis in phase with said uniform sector opening while the other grating section cuts said optic axis in phase with said graduated sector opening.

9. A disc having a sector grating of uniform angular width, and angularly displaced therefrom a sector grating of graduated angular width having the opaque portions of each grating in circular continuation alignment with the openings of the other grating.

10. A disc having a sector grating comprising alternate arcuate opaque portions and openings of equal angular width, and angularly displaced therefrom a sector grating comprising alternate arcuate opaque portions and openings of graduated angular width, the arcuate opaque portions of each sector grating being in circular continuation alignment with the arcuate openings of the other sector grating, and the arcuate opaque portions and openings of said sector gratings having equal radii of curvature.

11. In apparatus of the class described, in combination, a disc having a sector grating of uniform angular width and angularly displaced therefrom a sector grating of graduated angular width, the opaque portions of each grating being in circular continuation alignment with the openings of the other grating, means for rotatably mounting said disc so that on rotation thereof said uniform and graduated sector gratings cut across the optic axis of said apparatus, means for driving said disc, an opaque wheel, a pair of angularly displaced transparent cells mounted in said wheel, means for rotatably mounting said wheel so that on rotation thereof said cells cut said optic axis, and means for driving said wheel so that one of said transparent cells cuts said optic axis in phase with said uniform sector opening while the other of said transparent cells cuts said optic axis in phase with said graduated sector opening.

12. In apparatus of the class described, in combination, a shaft rotatably mounted in suitable bearings in substantially parallel alignment with the optic axis of said apparatus, motor means for driving said shaft, a disc fixedly co-axially mounted on said shaft having a sector grating of uniform angular width and angularly displaced therefrom a sector grating of graduated angular width, the opaque portions of each grating being in circular continuation alignment with the openings of the other grating, said uniform and graduated sector gratings cutting said optic axis on rotation of said disc, an opaque wheel fixedly co-axially mounted on said shaft and cutting said optic axis, a transparent sample cell carried in said wheel in alignment with said uniform sector grating, and a transparent standard cell carried in said wheel in alignment with said graduated sector grating.

13. In apparatus of the class described for use in obtaining spectral reflectance data, in combination, a sector disc having a sector opening of uniform angular width and angularly displaced therefrom a sector opening of graduated angular width, means for rotatably mounting said sector disc so that on rotation thereof said uniform and graduated sector openings cut the optic axis of said apparatus, means for driving said sector disc, a two-sectioned grating screen having the opaque portions of each section in continuation alignment with the openings of the other section, means for mounting said grating screen for oscillatory movement across said optic axis, means for oscillating said grating screen so that one of said grating sections cuts said optic axis in phase with said uniform sector opening while the other grating section cuts said optic axis in phase with said graduated sector opening, disc means, a reflectance sample and a reflectance standard mounted in angularly spaced relationship on said disc means, means for rotatably mounting said disc means so that on rotation thereof said reflectance sample and standard cut said optic axis, means for driving said disc means so that said reflectance sample cuts said optic axis in phase with said uniform sector opening while the reflectance standard cuts said optic axis in phase with said graduated sector opening, and a light source so mounted that a light beam therefrom will strike the plane of said reflectance sample and standard substantially at the point where the same cut the optic axis whereby the light beam is reflected down said optic axis each time said reflectance sample and standard cut the same.

14. In apparatus of the class described for use in obtaining spectral reflectance data, in combination, a shaft rotatably mounted in suitable bearings in substantially parallel alignment with the optic axis of said apparatus, motor means for driving said shaft, a sector disc fixedly coaxially mounted on said shaft having a sector opening of uniform angular width and angularly spaced therefrom a sector opening of graduated angular width, said uniform and graduated sector openings cutting said optic axis on rotation of said sector disc, a two-sectioned grating screen having the opaque portions of each section in continuation alignment with the openings of the other section, reed means astride said shaft for mounting said grating screen for oscillatory movement across said optic axis, cam means mounted on said shaft between said reeds for oscillating said grating screen so that one of said grating sections cuts the optic axis in phase with said uniform sector opening while the other grating section cuts said optic axis in phase with said graduated sector opening, a sector fly wheel fixedly co-axially mounted on said shaft having a pair of openings in alignment with said uniform and graduated sector openings, a reflectance sample mounted on said sector fly wheel in alignment with said uniform sector opening, a reflectance standard mounted on said sector fly wheel in alignment with said graduated sector opening, and means providing a light beam which intersects the plane of said reflectance sample and standard substantially at the point where said optic axis cuts this plane and at such an angle that part of said light beam is reflected from said reflectance sample and standard down said optic axis.

15. The method of obtaining spectral intensity data which comprises; projecting a light beam towards the slit of a spectrograph; cutting said light beam alternately and in rapid succession with a spectral sample and a spectral standard; dividing said light beam on each passage thereof through said spectral sample into a plurality of spaced separate light bands of equal light energy which are directed upon said slit; dividing said light beam on each passage through said spectral standard into a plurality of spaced separate light bands of graduated light energy which are likewise directed upon said slit; said plurality of spaced separate light bands of equal light energy being incident on said slit in spaced interfitting relationship with said plurality of spaced separate bands of graduated light energy to thereby prevent interference with each other; and, preventing said light beam from reaching said slit except when it is divided into said light bands of equal or graduated light energy.

16. The method of obtaining spectral transmittance data which comprises; projecting a light beam towards the slit of a spectrograph; cutting said light beam alternately and in rapid succession with a spectral transmittance sample and a spectral transmittance standard; dividing said light beam on each passage thereof through said spectral transmittance sample into a plurality of separate spaced light bands of equal light energy which are directed upon said slit; dividing said light beam on each passage thereof through said spectral transmittance standard into a plurality of separate spaced light bands of graduated light energy which likewise are directed upon said slit; said plurality of spaced separate light bands of equal light energy being incident on said slit in spaced interfitting relationship with said plurality of spaced separate bands of graduated light energy to thereby prevent interference with each other; and, preventing said light beam from reaching said slit except when it is divided into said light bands of equal or graduated light energy.

17. The method of obtaining spectral reflectance data which comprises; reflecting a light beam towards the slit of a spectrograph alternately and in rapid succession from a spectral reflectance sample and a spectral reflectance standard; dividing said light beam on each reflectance thereof from said spectral reflectance sample into a plurality of separate spaced light bands of equal light energy which are directed upon said slit; dividing said light beam on each reflectance thereof from said spectral reflectance standard into a plurality of separate spaced light bands of graduated light energy which likewise directed upon said slit; said plurality of spaced separate light bands of equal light energy being incident on said slit in spaced interfitting relationship with said plurality of spaced separate bands of graduated light energy to thereby prevent interference with each other; and, preventing said light beam from reaching said slit except when it is divided into said light bands of equal or graduated light energy.

18. In apparatus of the class described, in combination, means for projecting a light beam along the optic axis of said apparatus, means for mounting a sample the spectral properties of which are to be examined, means for mounting a standard to which the spectral properties of said sample are to be referred, means for passing said sample and said standard in rapid succession across the optic axis of said apparatus whereby said light beam is alternately cut by said sample and said standard, means for dividing said light beam each time it is cut by said sample into a plurality of spaced separate light bands of equal light energy, and means for dividing said light beam each time it is cut by said standard into a plurality of spaced apart light bands of graduated light energy which interfit in spaced relationship with said plurality of spaced separate light bands of equal light energy so as not to interfere therewith.

19. In apparatus of the class described, in combination, means for projecting a light beam along the optic axis of said apparatus, a two-compartment cell for holding a sample the spectral transmittance properties of which are to be examined and a spectral transmittance standard to which the sample is to be compared, means for mounting said two-compartment cell for oscillatory movement across said optic axis whereby said light beam is alternately cut by said sample and said standard, means for dividing said light beam each time it is cut by said sample into a plurality of spaced separate light bands of equal light energy, and means for dividing said light beam each time it is cut by said standard into a plurality of spaced apart light bands of graduated light energy which interfit in spaced relationship with said plurality of spaced separate light bands of equal light energy so as not to interfere therewith.

20. In apparatus of the class described, in combination, means for projecting a light beam along the optic axis of said apparatus, a wheel, a pair of angularly displaced transparent cells mounted on said wheel one cell being adapted to hold a sample the spectral transmittance properties of which are to be examined and the other cell being adapted to hold a spectral transmittance standard to which the sample is to be compared, means for rotatably mounting said wheel so that on rotation thereof said cells cut said optic axis whereby said light beam is alternately cut by said sample and said standard, means for dividing said light beam each time it is cut by said sample into a plurality of spaced separate light bands of equal light energy, and means for dividing said light beam each time it is cut by said standard into a plurality of spaced apart light bands of graduated light energy which interfit in spaced relationship with said plurality of spaced separate light bands of equal light energy so as not to interfere therewith.

21. In apparatus of the class described, in combination, means for mounting a reflectance sample the spectral properties of which are to be examined, means for mounting a reflectance standard to which the sample is to be compared, means for passing said reflectance sample and reflectance standard alternately across the optic axis of the apparatus, a light source so disposed that a light beam therefrom will strike said reflectance sample and reflectance standard at the points where the same cut the optic axis whereby the light beam is reflected along said optic axis each time said reflectance sample and standard cut the same, means for dividing said light beam each time it is reflected along the optic axis from the reflectance sample into a plurality of spaced separate light bands of equal light energy, and means for dividing said light beam each time it is reflected along the optic axis from the reflectance standard into a plurality of spaced apart light bands of graduated light energy which interfit in spaced relationship with said plurality of spaced separate light bands of equal light energy so as not to interfere therewith.

22. In apparatus of the class described, in combination, disc means, a reflectance sample and a reflectance standard mounted in angularly spaced relationship on said disc means, means for rotatably mounting said disc means so that on rotation thereof said reflectance sample and standard alternately cut the optic axis of said apparatus, a light source so mounted that a light beam therefrom will strike the planes of said reflectance sample and standard substantially at the points where the same cut the optic axis whereby the light beam is reflected along said optic axis each time said reflectance sample and standard cut the same, means for dividing said light beam each time it is reflected along the optic axis from the reflectance sample into a plurality of spaced separate light bands of equal light energy, and means for dividing said light beam each time it is reflected along the optic axis from the reflectance standard into a plurality of spaced apart light bands of graduated light energy which interfit in spaced relationship with said plurality of spaced separate light bands of equal light energy so as not to interfere therewith.

23. In apparatus of the class described, in combination, means for projecting a light beam along the optic axis of said apparatus, means for mounting a sample the spectral properties of which are to be examined, means for mounting a standard to which the spectral properties of said sample are to be referred, rotary means operable to move said sample and said standard in rapid succession across the optic axis of said apparatus whereby said light beam is alternately cut by said sample and said standard, means including a rotating sector aperture for dividing such beam each time it is cut by said sample into a plurality of spaced separate light bands of equal light energy and means including a rotating sector aperture of varying dimensions for dividing said light beam each time it is cut by said standard into a plurality of spaced apart light bands of graduated light energy which interfit in spaced relationship with said plurality of spaced, separate light bands of equal light energy so as not to interfere therewith.

JOHANNES A. VAN DEN AKKER.